United States Patent
Popovic et al.

(10) Patent No.: US 11,956,107 B2
(45) Date of Patent: Apr. 9, 2024

(54) CLIENT DEVICE AND NETWORK ACCESS NODE FOR TRANSMITTING AND RECEIVING A RANDOM ACCESS PREAMBLE

(71) Applicant: HUAWEI TECHNOLOGIES CO., LTD., Guangdong (CN)

(72) Inventors: Branislav M. Popovic, Kista (SE); Peng Wang, Kista (SE); Fredrik Berggren, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 411 days.

(21) Appl. No.: 17/370,444

(22) Filed: Jul. 8, 2021

(65) Prior Publication Data
US 2021/0337604 A1    Oct. 28, 2021

Related U.S. Application Data (63) Continuation of application No. PCT/EP2019/050363, filed on Jan. 9, 2019.

(51) Int. Cl.
*H04L 27/26* (2006.01)
*H04J 13/00* (2011.01)
(Continued)

(52) U.S. Cl.
CPC ...... *H04L 27/2613* (2013.01); *H04J 13/0062* (2013.01); *H04L 5/0041* (2013.01);
(Continued)

(58) Field of Classification Search
CPC .............. H04L 27/2613; H04L 5/0041; H04L 27/2614; H04J 13/0062; H04J 13/0055;
(Continued)

(56) References Cited

U.S. PATENT DOCUMENTS

| | | | | |
|---|---|---|---|---|
| 2008/0310383 A1* | 12/2008 | Kowalski | ................ | H04J 13/10 370/342 |
| 2010/0086082 A1* | 4/2010 | Ogawa | ................ | H04L 27/2626 375/308 |

(Continued)

FOREIGN PATENT DOCUMENTS

| CN | 106105361 A | 11/2016 |
|---|---|---|
| CN | 108271271 A | 7/2018 |

(Continued)

OTHER PUBLICATIONS

Office Action issued in Chinese Application No. 201980087729.8 dated Jan. 10, 2022, 11 pages.

(Continued)

*Primary Examiner* — Jae Y Lee
(74) *Attorney, Agent, or Firm* — Fish & Richardson P.C.

(57) ABSTRACT

The invention relates to a client device (100) and a network access node (300) for transmitting and receiving a random access preamble. The modulation sequence for the random access preamble is based on a first sequence and a second sequence. The first sequence is a sequence from a set of near-orthogonal sequences and the second sequence is a sequence from a set of constant envelope sequences. Due to its construction, the random access preamble herein provides low PAPR and suppresses the side-lobes in its auto-correlation function while producing a set of preambles with low cross-correlation. Furthermore, the invention also relates to corresponding methods and a computer program.

20 Claims, 3 Drawing Sheets

(51) Int. Cl.
*H04L 5/00* (2006.01)
*H04W 72/0446* (2023.01)
*H04W 72/0453* (2023.01)
*H04W 74/00* (2009.01)
*H04W 74/0833* (2024.01)

(52) U.S. Cl.
CPC ... *H04W 72/0446* (2013.01); *H04W 72/0453* (2013.01); *H04W 74/008* (2013.01); *H04W 74/0841* (2013.01)

(58) Field of Classification Search
CPC ......... H04W 72/0446; H04W 72/0453; H04W 74/008; H04W 74/0841; H04W 74/0833
See application file for complete search history.

(56) References Cited

U.S. PATENT DOCUMENTS

| | | | | |
|---|---|---|---|---|
| 2010/0195700 A1* | 8/2010 | Ogawa | ................ | H04J 13/10 375/132 |
| 2015/0305062 A1 | 10/2015 | Sung et al. | | |
| 2017/0257193 A1 | 9/2017 | Yan et al. | | |

FOREIGN PATENT DOCUMENTS

| | | | | |
|---|---|---|---|---|
| WO | 2008/098221 | * | 8/2008 | ............... H04Q 7/38 |
| WO | 2018/045247 | * | 3/2018 | ............ H04W 74/08 |
| WO | 2018045247 A1 | | 3/2018 | |

OTHER PUBLICATIONS

3GPP TR38.889 V1.0.0 (Nov. 2018), "3rd Generation Partnership Project; Technical Specification Group Radio Access Network;Study on NR-based Access to Unlicensed Spectrum;(Release 16)," Nov. 2018, 120 pages.

Ericsson, "On UL signals and channels," 3GPP TSG-RAN WG1 Meeting #94, R1-1809203, Gothenburg, Sweden, Aug. 20-24, 2018, 3 pages.

ETSI EN 301 893, V2.1.1 (May 2017), "5 GHz RLAN; Harmonised Standard covering the essential requirements of article 3.2 of Directive 2014/53/EU," May 2017, 122 pages.

Huawei, HiSilicon, "UL PHY channels for NR unlicensed," 3GPP TSG RAN WG1 Meeting #94, R1-1808060, Gothenburg, Sweden, Aug. 20-24, 2018, 17 pages.

Huawei, HiSilicon, "UL PHY channels for NR unlicensed," 3GPP TSG RAN WG1 Meeting #95, R1-1812193, Spokane, USA, Oct. 12-16, 2018, 22 pages.

Huawei, HiSilicon, "Zero-autocorrelation zone of frequency-interlaced PRACH," 3GPP TSG RAN WG1 Meeting #94, R1-1808066, Gothenburg, Sweden, Aug. 20-24, 2018, 7 pages.

InterDigital Inc., "On UL Physical Layer Channel Design for NR-U," 3GPP TSG RAN WG1 Meeting #92b, R1-1804869, Sanya, China, Apr. 16-20, 2018, 17 pages.

PCT International Search Report and Written Opinion issued in International Application No. PCT/EP2019/050363 dated Sep. 16, 2019, 12 pages.

* cited by examiner

CLIENT DEVICE AND NETWORK ACCESS NODE FOR TRANSMITTING AND RECEIVING A RANDOM ACCESS PREAMBLE

CROSS-REFERENCE TO RELATED APPLICATIONS

This application is a continuation of International Application No. PCT/EP2019/050363, filed on Jan. 9, 2019. The disclosure of which is hereby incorporated by reference in its entirety.

TECHNICAL FIELD

The invention relates to a client device and a network access node for transmitting and receiving a random access preamble. Furthermore, the invention also relates to corresponding methods and a computer program.

BACKGROUND

In cellular communication systems, such as Long Term Evolution (LTE) and New Radio (NR), the User Equipment (UE) can send Physical Random Access Channel (PRACH) preambles to the base station, e.g., eNB or gNB. The purpose of transmitting the preamble could, e.g., be random access, handover request, time synchronization, beam management, beam recovery etc., including both contention-based and contention-free PRACH transmissions. Typically, the PRACH preamble is a signal or a sequence, which is detected at the base station by means of a correlation receiver, e.g., a matched filter. If the arrival timing of the preamble is unknown (e.g., if it is used for initial access), the receiver has to perform detection within a detection window, of which the length depends on the round-trip-time delay and the channel delay spread. The detection performance is therefore dependent on the auto-correlation properties, wherein it is desirable to have a narrow main-lobe and small side-lobes. Moreover, since multiple UEs may transmit on the same time-frequency resource, the cross-correlation among PRACH preambles should be low. It is also desirable that the PRACH preamble exhibits low Peak-to-Average-Power Ratio (PAPR) since it allows operating the transmitter power amplifier with a small power backoff, thereby increasing the output power. It is also advantageous if a large number of PRACH preambles could be generated, since that increases the preamble reuse factor in the system, which decreases the inter-cell interference.

In a multicarrier system (e.g., OFDM), a PRACH preamble could be generated by mapping a modulation sequence onto a set of subcarriers. In contemporary systems, such as LTE and NR, Zadoff-Chu (ZC) sequences are deployed for PRACH on a set of contiguous subcarriers. These preambles are known to have ideal auto-correlation properties, i.e., there is a Zero-Auto-correlation-Zone (ZAZ), and their cross-correlation is low. However, in certain cases it is not preferable to use a set of contiguous subcarriers. For example, in unlicensed spectrum, there are limits on the maximum Power Spectral Density (PSD) and requirements on minimum Occupied Channel Bandwidth (OCB). The PSD requirement could be, e.g., in terms of a maximum transmit power per any 1 MHz bandwidth part of a signal, which means that it is advantageous to map the modulation sequence to a wide bandwidth to increase the transmit power. The OCB requirement implies that the signal is to occupy a certain percentage, e.g., 80%, of the carrier bandwidth, which means that the modulation sequence has to be mapped over a sufficiently large portion of the carrier bandwidth. These requirements have resulted in preambles that map the modulation sequence into time-frequency blocks of contiguous subcarriers, e.g., Physical Resource Blocks (PRBs), which are non-consecutive and spread over the carrier bandwidth. The frequency spacing between the mapped PRBs could be either uniform or non-uniform and the set of mapped PRBs is sometimes referred to as an interlacement, or an interlace. This type of waveform is sometimes referred to as Block-Interleaved Frequency Division Multiple Access (B-IFDMA) as signals can be orthogonally multiplexed in different blocks, e.g., PRACH could be multiplexed with other channels like Physical Uplink Control Channel (PUCCH) and Physical Uplink Shared Channel (PUSCH), if they also are allocated with the same interlaced structure. One example of an interlace is to allocate every n:th PRB. One or several interlaces could be allocated for transmitting the random access preamble.

It has been shown that a random access preamble that maps the modulation sequence onto a uniformly frequency spaced set of PRBs exhibits a ZAZ, of which the length depends on the frequency spacing between the PRBs. However, it can be found that large side-lobes appear outside the ZAZ in the auto-correlation function. These side-lobes are problematic if the detection window is larger than the ZAZ as they could result in large mis-detection probability and large time synchronization estimation error.

There are two prioritized performance measures for the random access preamble:
  Mis-detection probability: The probability that a transmitted preamble is not detected or a transmitted preamble is detected with a time synchronization estimation error beyond a certain limit;
  False detection probability: The probability that a preamble which is not transmitted is detected.

Large side-lobes in the auto-correlation function of a random access preamble increase the mis-detection probability and create large time synchronization estimation errors. Large cross-correlation among preambles increase the false detection probability.

SUMMARY

An objective of embodiments of the invention is to provide a solution which mitigates or solves the drawbacks and problems of conventional solutions.

Another objective of embodiments of the invention is to provide a solution which improves performance, such as reduced mis-detection probability and false detection probability, compared to conventional solutions.

The above and further objectives are solved by the subject matter of the independent claims. Further advantageous embodiments of the invention can be found in the dependent claims.

According to a first aspect of the invention, the above mentioned and other objectives are achieved with a client device for a wireless communication system, the client device being configured to:
  determine at least one time-frequency resource allocated for a random access preamble;
  determine a modulation sequence for the random access preamble, wherein the modulation sequence is based on a first sequence and a second sequence, the first sequence being a sequence from a set of near-orthogonal sequences and the second sequence being a sequence from a set of constant envelope sequences;

transmit a signal comprising a random access preamble to a network access node, wherein the random access preamble comprises the modulation sequence mapped onto the determined time-frequency resources.

The random access preamble herein can e.g., be a PRACH random access preamble used in 3GPP LTE and NR systems.

An advantage of the client device according to the first aspect is that the random access preamble due to its construction provides low PAPR and suppresses the side-lobes in its auto-correlation function while producing a set of preambles with low cross-correlation.

In an implementation form of a client device according to the first aspect, the modulation sequence is a product of the first sequence and the second sequence.

In an implementation form of a client device according to the first aspect, the time-frequency resources of the wireless communication system are divided into disjoint frequency subbands, and wherein the time-frequency resources allocated for the random access preamble is the same in each of the disjoint frequency subbands.

That the time-frequency resources allocated for the random access preamble is the same in each subband can mean that the allocation of subcarriers used for the random access preamble within a first subband is the same as the allocation of subcarriers used for the random access preamble within a second subband, where the first and second subband can be disjoint, i.e., have no subcarriers in common. For example, if the n:th subcarrier of the first subband is allocated, also the n:th subcarrier of the second subband is allocated.

An advantage with this implementation form is that the random access preamble will produce a Zero-Correlation Zone (ZAZ), of which the length is depending on the size of the subband.

In an implementation form of a client device according to the first aspect, the time-frequency resources allocated for the random access preamble are non-contiguous in frequency. This can be achieved by using non-contiguous resource blocks. It could also be achieved by using contiguous resource blocks with non-contiguous subcarriers.

An advantage with this implementation form is that the random access preamble could be constructed to meet requirements on OCB and to maximize the transmit power under constraints on the PSD.

In an implementation form of a client device according to the first aspect, the time-frequency resources allocated for the random access preamble comprises a plurality of subcarriers, and wherein a length of the first sequence is equal to the number of subcarriers in each of the disjoint frequency subbands allocated for the random access preamble.

An advantage with this implementation form is that the first sequence can be constructed to provide good auto- and cross-correlation properties of the random access preamble.

In an implementation form of a client device according to the first aspect, the time-frequency resources allocated for a random access preamble comprises a plurality of subcarriers, and wherein a length of the second sequence is equal to the total number of subcarriers from all of the disjoint frequency subbands allocated for the random access preamble.

An advantage with this implementation form is that the second sequence can be constructed to provide good PAPR properties of the random access preamble.

In an implementation form of a client device according to the first aspect, a length of the first sequence is shorter than a length of the second sequence.

In an implementation form of a client device according to the first aspect, the first sequence is repeated so that a length of the repeated first sequence is equal to a length of the second sequence.

An advantage with this implementation form is that the random access preamble sequence can be obtained as the product of the repeated first sequence and the second sequence which can combine the good properties of each of the first and second sequences.

In an implementation form of a client device according to the first aspect, the set of near-orthogonal sequences only comprises orthogonal sequences.

An advantage with this implementation form is that simple constructions of sets of orthogonal sequences could be applied.

In an implementation form of a client device according to the first aspect, the set of non-orthogonal sequences is constructed from a set of orthogonal sequences by expurgating at least one element of said orthogonal sequences and removing a subset of said expurgated sequences.

An advantage with this implementation form is that sequence sets providing low cross-correlation could be constructed and the expurgation could easily adjust the sequence length to the available number of subcarriers.

In an implementation form of a client device according to the first aspect, the set of constant envelope sequences comprises a single sequence.

An advantage with this implementation form is that the random access preamble will produce a Zero-Correlation Zone (ZCZ).

In an implementation form of a client device according to the first aspect, at least one of the first sequence and the second sequence is any of a Zadoff-Chu (ZC) sequence; a permutation of a ZC sequence; or a cyclic shift of a ZC sequence.

An advantage with this implementation form is that properties of the ZC sequence could be inherited, including low PAPR, constant envelope and good auto- and cross-correlation properties.

In an implementation form of a client device according to the first aspect, at least one of the first sequence and the second sequence is any of a Discrete Fourier Transform (DFT) sequence; a permutation of a DFT sequence; or a cyclic shift of a DFT sequence.

An advantage with this implementation form is that properties of the DFT sequence could be inherited, including low PAPR, constant envelope and good auto- and cross-correlation properties.

In an implementation form of a client device according to the first aspect, the second sequence a is generated according to the formula $$a(u) = W_t^{(u \bmod A)\lfloor \frac{u}{A} \rfloor},$$

$$u = 0, 1, 2, \ldots, At-1,$$

where $$W_t = e^{-\sqrt{-1}\frac{2\pi}{t}},$$

A is the number of time-frequency resources allocated for the random access preamble in a subband, t is the number of subbands, mod is the modulo operator, and $\lfloor \cdot \rfloor$ is the floor function.

An advantage with this implementation form is that the PAPR could become low.

In an implementation form of a client device according to the first aspect, the second sequence a is generated according to the formula $$a_q(u) = W_t^{\pi_q(u \bmod A)\lfloor \frac{u}{A} \rfloor},$$

$$u = 0, 1, 2, \ldots, At-1,$$

where $\pi_q(\cdot)$ is a permutation over the set $\{0, 1, 2, \ldots, A-1\}$, $$W_t = e^{-\sqrt{-1}\frac{2\pi}{t}},$$

A is the number of time-frequency resources allocated for the random access preamble in a subband, t is the number of subbands, mod is the modulo operator, and $\lfloor \cdot \rfloor$ is the floor function.

An advantage with this implementation form is that the PAPR could become low, while more random access preambles could be generated by means of the permutations.

According to a second aspect of the invention, the above mentioned and other objectives are achieved with a network access node for a wireless communication system, the network access node being configured to
receive a signal comprising a random access preamble from a client device, wherein the random access preamble comprises a modulation sequence mapped onto at least one time-frequency resource allocated for a random access preamble, wherein the modulation sequence is based on a first sequence and a second sequence, the first sequence being a sequence from a set of near-orthogonal sequences and the second sequence being a sequence from a set of constant envelope sequences;
determine the time-frequency resources allocated for a random access preamble;
detect at least one of the random access preamble and an arrival time of the random access preamble based on the determined time-frequency resources allocated for a random access preamble and the signal.

An advantage of the network access node according to the second aspect is that the random access preamble due to its construction provides low PAPR and suppresses the sidelobes in its auto-correlation function while producing a set of preambles with low cross-correlation.

In an implementation form of a network access node according to the second aspect, detect the random access preamble comprises
correlate the received signal with one or more candidate random access preambles.

According to a third aspect of the invention, the above mentioned and other objectives are achieved with a method for a client device, the method comprises determining at least one time-frequency resource allocated for a random access preamble;
determining a modulation sequence for the random access preamble, wherein the modulation sequence is based on a first sequence and a second sequence, the first sequence being a sequence from a set of near-orthogonal sequences and the second sequence being a sequence from a set of constant envelope sequences;
transmitting a signal comprising a random access preamble to a network access node, wherein the random access preamble comprises the modulation sequence mapped onto the determined time-frequency resources.

The method according to the third aspect can be extended into implementation forms corresponding to the implementation forms of the client device according to the first aspect. Hence, an implementation form of the method comprises the feature(s) of the corresponding implementation form of the client device.

The advantages of the methods according to the third aspect are the same as those for the corresponding implementation forms of the client device according to the first aspect.

According to a fourth aspect of the invention, the above mentioned and other objectives are achieved with a method for a network access node, the method comprises receiving a signal comprising a random access preamble from a client device, wherein the random access preamble comprises a modulation sequence mapped onto at least one time-frequency resource allocated for a random access preamble, wherein the modulation sequence is based on a first sequence and a second sequence, the first sequence being a sequence from a set of near-orthogonal sequences and the second sequence being a sequence from a set of constant envelope sequences;
determining the time-frequency resources allocated for a random access preamble;
detecting at least one of the random access preamble and an arrival time of the random access preamble based on the determined time-frequency resources allocated for a random access preamble and the signal.

The method according to the fourth aspect can be extended into implementation forms corresponding to the implementation forms of the network access node according to the second aspect. Hence, an implementation form of the method comprises the feature(s) of the corresponding implementation form of the network access node.

The advantages of the methods according to the fourth aspect are the same as those for the corresponding implementation forms of the network access node according to the second aspect.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION

Figure 1:
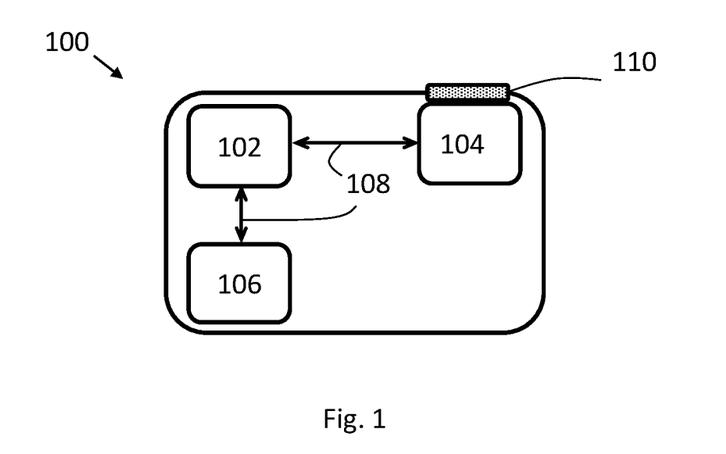
FIG. 1 shows a client device according to an embodiment of the invention.

FIG. 1 shows a client device 100 according to an embodiment of the invention. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which means that the client device 100 is configured for wireless communications in a wireless communication system. That the client device 100 is configured to perform certain actions can in this disclosure be understood to mean that the client device 100 comprises suitable means, such as e.g. the processor 102 and the transceiver 104, configured to perform said actions.

According to embodiments of the invention the client device 100 is configured to determine at least one time-frequency resource allocated for a random access preamble. The client device 100 is further configured to determine a modulation sequence for the random access preamble. The modulation sequence is based on a first sequence and a second sequence, wherein the first sequence is a sequence from a set of near-orthogonal sequences and the second sequence is a sequence from a set of constant envelope sequences. The client device 100 is further configured to transmit a signal 510 comprising a random access preamble to a network access node 300 (see FIG. 5). The random access preamble comprises the modulation sequence mapped onto the determined time-frequency resources.

According to an embodiment of the invention, the modulation sequence is based on a product of a first sequence and a second sequence.

Figure 2:
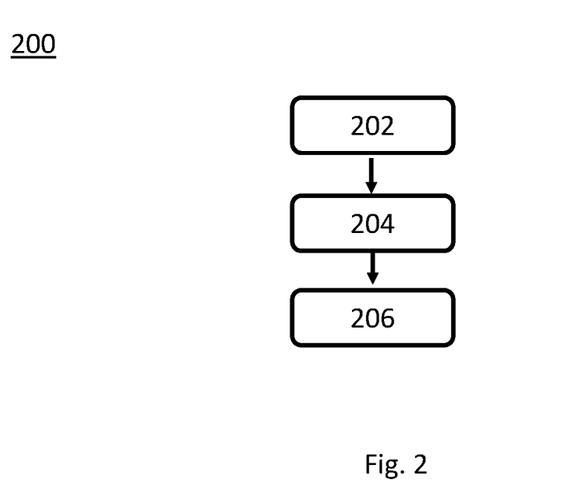
FIG. 2 shows a method for a client device according to an embodiment of the invention.

FIG. 2 shows a flow chart of a method 200 which may be executed in a client device 100, such as the one shown in FIG. 1. The method 200 comprises determining 202 at least one time-frequency resource allocated for a random access preamble. The method 200 further comprises determining 204 a modulation sequence for the random access preamble. The modulation sequence is based on a first sequence and a second sequence, wherein the first sequence is a sequence from a set of near-orthogonal sequences and the second sequence is a sequence from a set of constant envelope sequences. The method 200 further comprises transmitting 206 a signal 510 comprising a random access preamble to a network access node 300. The random access preamble comprises the modulation sequence mapped onto the determined time-frequency resources.

Figure 3:
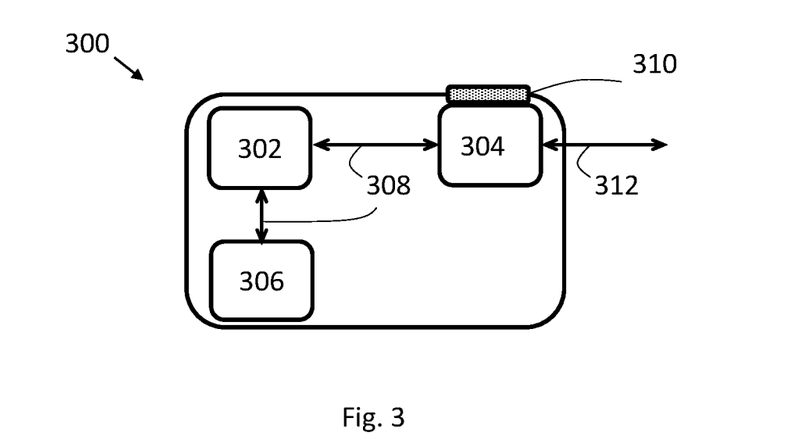
FIG. 3 shows a network access node according to an embodiment of the invention.

FIG. 3 shows a network access node 300 according to an embodiment of the invention. In the embodiment shown in FIG. 3, the network access node 300 comprises a processor 302, a transceiver 304 and a memory 306. The processor 302 is coupled to the transceiver 304 and the memory 306 by communication means 308 known in the art. The network access node 300 may be configured for both wireless and wired communications in wireless and wired communication systems, respectively. The wireless communication capability is provided with an antenna or antenna array 310 coupled to the transceiver 304, while the wired communication capability is provided with a wired communication interface 312 coupled to the transceiver 304. That the network access node 300 is configured to perform certain actions can in this disclosure be understood to mean that the network access node 300 comprises suitable means, such as e.g. the processor 302 and the transceiver 304, configured to perform said actions.

Figure 5:
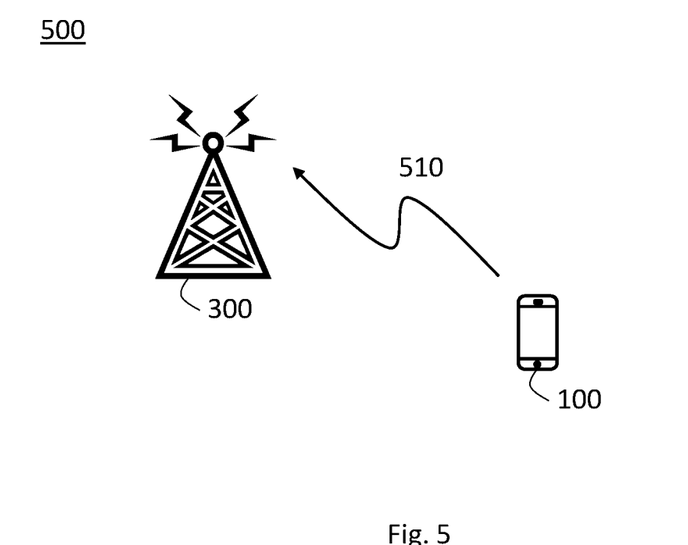
FIG. 5 shows a wireless communication system according to an embodiment of the invention.

According to embodiments of the invention the network access node 300 is configured to receive a signal 510 comprising a random access preamble 510 from a client device 100 (see FIG. 5). The random access preamble comprises a modulation sequence mapped onto at least one time-frequency resource allocated for a random access preamble. The modulation sequence is based on a first sequence and a second sequence, wherein the first sequence is a sequence from a set of near-orthogonal sequences and the second sequence is a sequence from a set of constant envelope sequences. The network access node 300 is further configured to determine the time-frequency resources allocated for a random access preamble. The network access node 300 is further configured to detect at least one of the random access preamble and an arrival time of the random access preamble based on the determined time-frequency resources allocated for a random access preamble and the signal 510.

Figure 4:
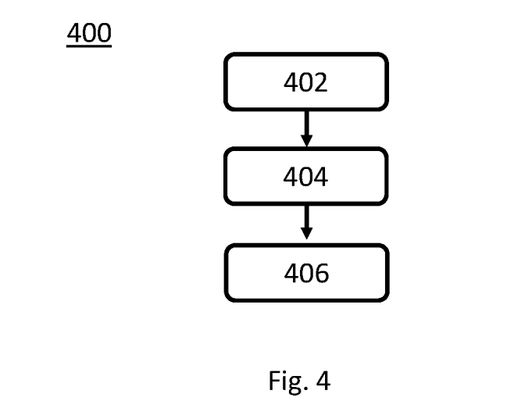
FIG. 4 shows a method for a network access node according to an embodiment of the invention.

FIG. 4 shows a flow chart of a corresponding method 400 which may be executed in a network access node 300, such as the one shown in FIG. 3. The method 400 comprises receiving 402 a signal 510 comprising a random access preamble 510 from a client device 100, wherein the random access preamble 510 comprises a modulation sequence mapped onto at least one time-frequency resource allocated for a random access preamble, wherein the modulation sequence is based on a first sequence and a second sequence, the first sequence being a sequence from a set of near-orthogonal sequences and the second sequence being a sequence from a set of constant envelope sequences. The method 400 further comprises determining 404 the time-frequency resources allocated for a random access preamble. The method 400 further comprises detecting 406 at least one of the random access preamble and an arrival time of the random access preamble based on the determined time-frequency resources allocated for a random access preamble and the signal 510.

According to an embodiment of the invention 16, the network access node 300 is configured to correlate the received signal 510 with one or more candidate random access preambles so as to detect the random access preamble comprises.

Generally, if the random access preamble is known to the network access node 300, only its timing needs to be detected by the network access node 300. However, if the random access preamble is unknown to the network access node 300, both the random access preamble and its timing need to be detected by the network access node 300. The network access node 300 is configured to process the received signal 502 and may apply a correlation operation as to detect a peak value, which should be above a certain detection threshold in order to be a valid random access preamble candidate. The network access node 300 may further be configured to use a bank of correlators, each correlator being matched to one random access preamble, so as to determine which random access preamble was sent. The arrival timing can be determined from the location of the detected peak within a detection window. Moreover, in some applications, e.g., contention-free random access, the random access preamble sequence may be configured by the radio network, in which case the radio access node 300 may only need to use a single correlator for detecting the random access preamble.

FIG. 5 shows a wireless communication system 500 according to an embodiment of the invention. The wireless communication system 500 comprises a client device 100 and a network access node 300 configured to operate in the wireless communication system 500. For simplicity, the wireless communication system 500 shown in FIG. 5 only comprises one client device 100 and one network access node 300. However, the wireless communication system 500 may comprise any number of client devices 100 and any number of network access nodes 300 without deviating from the scope of the invention. In the wireless communication system 500, the client device 100 is configured to transmit a wireless communication signal 510 to the network access node 300. The wireless communication signal 502 comprises a random access preamble according to embodiments of the invention. Hence, the communication signal 510 can be any control signal according to a standard, such as LTE and NR.

Figure 6:
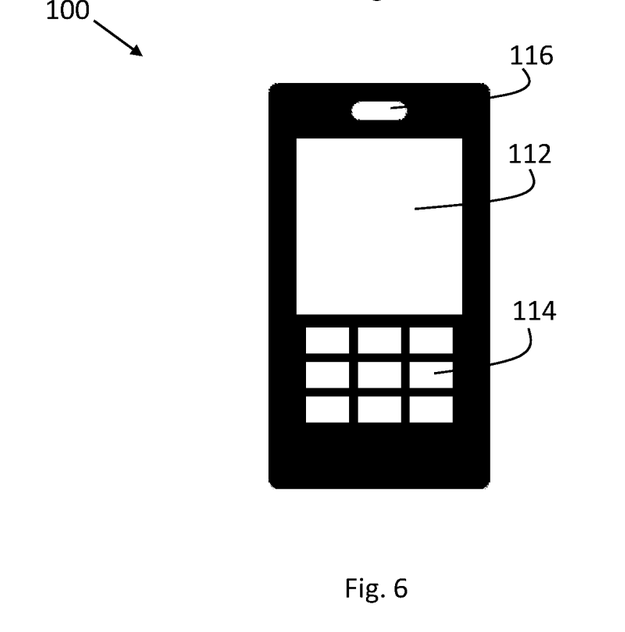
FIG. 6 illustrates a client device according to an embodiment of the invention.

FIG. 6 illustrates a non-limiting example of a client device 100 in the form of a mobile device. The mobile device houses at least one processor 102 (see FIG. 1), at least one display device 112, and at least one communications means (not shown in FIG. 6). The mobile device further comprises input means e.g. in the form of a keyboard 114 communicatively connected to the display device 112. The mobile device further comprises output means e.g. in the form of a speaker 116. The mobile device may be a mobile phone, a tablet PC, a mobile PC, a smart phone, a standalone mobile device, or any other suitable communication device.

To provide deeper understanding of embodiments of the invention consider a frequency band consisting of a set of N discrete frequencies $f=\{f_0, f_1, \ldots, f_{N-1}\}$ with uniform spacing $\Delta f$ between neighboring frequencies. A discrete frequency could represent a subcarrier or a resource element. Without loss of generality we can assume that $f_0=0$ and $\Delta f=1$, so we have $f=\{0,1,\ldots,N-1\}$. We further assume that $N=\delta t$, where $\delta$ and $t$ are positive integers, and divide N discrete frequencies into t interlacing subbands, such that each interlacing subband of $\delta$ subcarriers contains $B=\lfloor \delta/A \rfloor$ generalized Physical Resource Blocks (gPRBs) of A subcarriers, where $\lfloor x \rfloor$ is the greatest integer less than or equal to x (i.e., the floor function of x). We also assume that only one gPRB is used in each interlacing subband. The set of all t such gPRBs form an interlace. By selecting non-intersecting sets of A subcarriers (which, in contrast to the prior art PRB definition, may not need to be contiguous) we can construct B orthogonal gPRBs in each interlacing subband. Consequently, we can construct B orthogonal interlaces.

According to embodiments of the invention, the time-frequency resources of the wireless communication system 500 are divided into disjoint frequency subbands, and wherein the time-frequency resources allocated for the random access preamble is the same in each of the disjoint frequency subbands. It is understood that the actual time-frequency resources are different in different subbands, while their allocation within the subbands could be the same, i.e., allocating the n:th gPRB in every subband.

Furthermore, the time-frequency resources allocated for the random access preamble can be non-contiguous in frequency. For example, if less than B gPRBs are allocated for the random access preamble in a subband, the set of time-frequency resources from all subbands will be non-contiguous.

In multicarrier systems such as LTE and NR, the time-frequency resources allocated for the random access preamble comprise a plurality of subcarriers, and therefore a length of the first sequence can be equal to the number of subcarriers in each of the disjoint frequency subbands allocated for the random access preamble according to an embodiment.

In an embodiment of the invention, the time-frequency resources allocated for a random access preamble comprises a plurality of subcarriers, and wherein a length of the second sequence can be equal to the total number of subcarriers from all of the disjoint frequency subbands allocated for the random access preamble.

An interlace can be mathematically described as the set of used, i.e., allowed frequencies $\overline{\Omega}_m$, where $m=0,1,\ldots,B-1$ labels different orthogonal interlaces. Obviously, it holds that $$\overline{\Omega}_x \cap \overline{\Omega}_y = \emptyset \text{ if } x \neq y, \cap_{m=0}^{B-1} \overline{\Omega}_m \subseteq f. \tag{1}$$

The random access preamble $s_m(k)$ is obtained by a scaled Inverse Discrete Fourier Transform (IDFT) of a block-interleaved comb spectrum $\{S_m(f)\}$ defined over m-th interlace $\overline{\Omega}_m$, i.e., $$s_m(k) = K \frac{1}{N} \sum_{f=0}^{N-1} S_m(f) W_N^{-kf} \tag{2}$$

$$m = 0, 1, \ldots, B-1,$$
$$k = 0, 1, \ldots, N-1,$$
$$B = \lfloor \delta/A \rfloor$$
$$W_N = \exp(-\sqrt{-1}\, 2\pi/N)$$

$$|S_m(f)| = \begin{cases} 1, & \text{at } \overline{\Omega}_m \\ 0, & \text{at } \Omega_m \end{cases} \tag{3}$$

$$\overline{\Omega}_m = \{\delta i + \omega_{m,i,l} (\text{mod } N)\} \tag{4}$$
$$i = 0, 1, \ldots, t-1,$$
$$l = 0, 1, \ldots, A-1$$

where $\omega_{m,i,l}$ are allowed frequencies of the gPRB in i-th interlacing subband of the m-th interlace, such that $$0 \leq \omega_{m,i,0} < \ldots < \omega_{m,i,A-1} \leq \delta - 1 \tag{5}$$

The scaling constant $K=\sqrt{N}$ is chosen to ensure that the sequences $\{s_m(k)\}$ and $\{S_m(f)\}$ have the same energy $E=At$. A repetitive frequency resource allocation $\overline{\Omega}_m$ is defined by having the same allowed gPRB in each interlacing subband, i.e., removing the dependence on index i, $$\omega_{m,i,l} \triangleq j_{m,l}, \tag{6}$$

i.e., the same allowed RE locations $\{j_m | 0 \leq j_{m,0} < j_{m,1} < \ldots < j_{m,A-1} \leq \delta - 1\}$ are repeated in all the t subbands.

The generic sequence construction herein is based on a product modulation sequence obtained by modulating periodically a long sequence with a short sequence. Hence, according to an embodiment of the invention, a length of the first sequence is shorter than a length of the second sequence.

A set of A random access preambles $\{z_{m,n}(k)\}$, $n=0, 1, \ldots, A-1$, is obtained from the corresponding spectral modulation sequences $\{Z_{m,n}(f)\}$ constructed by mapping a set of A sequences $\{c_n(u)\}$, n=0,1, ... ,A−1, u=0, 1, ... ,At−1, to a single set of allowed frequencies $\overline{\Omega_m}$, so that $$Z_{m,n}(\overline{\Omega_m}) = c_n(Ai+l) \quad (7)$$

$$c_n(u) = b_n(u \bmod A)a(u) \quad (8)$$

where $b_n(u)$ is the n-th short sequence of length A from a set of near-orthogonal sequences; and a(u) is a long sequence of length At with constant envelope. It should be noted that also the near-orthogonal sequences could have constant envelope. It can be seen from Eq. (8) that the short sequence is repeated due to the mod A operation, if the index u becomes larger than A−1.

In an embodiment of the invention, the first sequence is repeated so that a length of the repeated first sequence is equal to a length of the second sequence.

Moreover, Eq. (8) is defined using a set of short sequences and a single long sequence.

In an embodiment of the invention, the set of constant envelope sequences comprises a single sequence. The magnitude of a constant envelope sequence is fixed.

Zadoff-Chu (ZC) sequences have an impulse-like auto correlation function. Hence, sets of orthogonal sequences can be generated by cyclically shifting a single ZC sequence. Discrete Fourier Transform (DFT) sequences are orthogonal by definition. ZC and DFT sequences are also constant envelope sequences and that property is maintained under a permutation of the sequence. These make ZC and DFT sequences relevant as constituent sequences in the construction of the random access preamble according to Eq. (2)-(4).

Therefore, according to embodiments of the invention, at least one of the first sequence and the second sequence is any of a ZC sequence; a permutation of a ZC sequence; or a cyclic shift of a ZC sequence.

Moreover, according to embodiments of the invention, at least one of the first sequence and the second sequence is any of a DFT sequence; a permutation of a DFT sequence; or a cyclic shift of a DFT sequence.

Orthogonal sequences are constructed from cyclically shifting a single ZC sequence or using a set of DFT sequences.

In an embodiment of the invention, the set of near-orthogonal sequences only comprises orthogonal sequences.

The generic modulation sequence design is applicable to any of the four alternatives of time-frequency resource allocation listed in 3GPP TR38.889 V16.0.0, "Study on NR-based Access to Unlicensed Spectrum". These four alternatives for allocating the time-frequency resources to the random access preamble are:
- Alt-1: Uniform PRB-level interlace mapping,
- Alt-2: Non-uniform PRB-level interlace mapping,
- Alt-3: Uniform RE-level interlace mapping, and
- Alt-4: Non-interlaced mapping.

The periodic cross-correlation function $\theta_{xy}(p)$ between the sequences $\{x(k)\}$ and $\{y(k)\}$ of length N is defined as $$\theta_{xy}(p) = \begin{cases} \sum_{f=0}^{N-1} X(f)Y^*(f)W_N^{pf}, & p \geq 0 \\ \theta_{yx}^*(-p), & p < 0 \end{cases} \quad (9)$$

where p is a cyclic shift of $\{y(k)\}$, $\{X(f)\}$ and $\{Y(f)\}$ are DFTs of $\{x(k)\}$ and $\{y(k)\}$ respectively, and "*" denotes the complex conjugation. The periodic autocorrelation function $\theta_{xx}(p)$ is said to have a Zero Autocorrelation Zone of length $D_{ZAZ}$ if $$\theta_{xx}(p) \begin{cases} = 0, & |p| = 1, 2, \ldots, D_{ZAZ} \\ \neq 0, & |p| = D_{ZAZ} + 1 \end{cases}.$$

The periodic cross-correlation function $\theta_{xy}(p)$ is said to have a Zero Cross-correlation Zone (ZCZ) of length $D_{ZCZ}$ if $$\theta_{xx}(p) \begin{cases} = 0, & |p| = 0, 1, \ldots, D_{ZCZ} \\ \neq 0, & |p| = D_{ZCZ} + 1 \end{cases}.$$

It can be shown that random access preambles defined by Eq. (2)-(4), have pairwise ZCZ of the same length as their Zero-Auto-Correlation-Zone (ZAZ), i.e., $D_{ZCZ} = D_{ZAZ} = t-1$. That is, by inserting Eq. (7) and (8) into Eq. (2) we obtain $$\theta_{z_{m,x}z_{m,y}}(p \geq 0) = \sum_{l=0}^{A-1} b_x(l)b_y^*(l)W_N^{pjm,l} \sum_{i=0}^{t-1} W_t^{pi}. \quad (10)$$

The inner sum in Eq. (10) would be zero for $p \neq 0$ (mod t). For p=0 we obtain $$\theta_{z_{m,x}z_{m,y}}(0) = t\sum_{l=0}^{A-1} b_x(l)b_y^*(l) = 0.$$

Therefore, according to an embodiment of the invention, the random access preamble has pairwise ZCZ of the same length as its ZAZ. This means that the client device 100 according to this embodiment is configured to determine a modulation sequence for the random access preamble such that the random access preamble has a ZCZ of the same length as a ZAZ.

It can be analytically shown that for some choices of the long sequence a(u), the random access preamble defined by Eq. (2)-(4) has constant magnitude. That is, the PAPR is equal to 0 dB, which allows maximum output from the power amplifier. Ultimately, the PAPR is measured on the radio signal and therefore, the baseband signal should be up-sampled (i.e., using a larger FFT size than the sequence length N) a number of times before computing the PAPR. In that case, the PAPR may be larger than 0 dB but Table 1 shows that with the random access preamble disclosed herein, a lower PAPR could still be achieved in comparison with other solutions, e.g., ZC sequences.

TABLE 1

| | | Max. PAPR (dB) | |
|---|---|---|---|
| | Sequence | $N_{FFT} = 8t$ | $N_{FFT} = 10^5$ |
| Alt-1 | ZC | 8.8271 | 8.9384 |
| | Generic | 0 | 6.0860 |
| Alt-2 | ZC | 7.7262 | 8.8843 |
| | Generic | 0 | 6.6424 |
| Alt-3 | ZC | 3.0671 | 3.0676 |
| | Generic | 0 | 6.2466 |

TABLE 1-continued

| | Sequence | Max. PAPR (dB) $N_{FFT} = \delta t$ | $N_{FFT} = 10^5$ |
|---|---|---|---|
| Alt-4 | ZC | 12.1317 | 12.1317 |
| | Generic | 5.7023 | 6.7996 |

Table 1. PAPR for the Different Alternatives of Time-Frequency Resource Allocation According to 3GPP TR38.889 V16.0.0, "Study on NR-Based Access to Unlicensed Spectrum".

While ideally the short sequences $b_m(u)$ should comprise an orthogonal set of sequences, the method can be further extended to use other types of sequences. For example, by providing a set of non-orthogonal sequences, judicious selection of sequences from this set could offer benefits in terms of lower cross-correlations between preambles within the detection window than using an orthogonal set of sequences. Non-orthogonal sequences may also be useful and simpler to construct for a given sequence length. For example, ZC sequences should preferably have a sequence length equal to a prime number in order to maximize the number of generated sequences, while the parameter A may not necessarily be a prime number. We will refer to such a set containing at least one pair of non-orthogonal sequences as a near-orthogonal set, wherein the sequences are almost orthogonal. That is, the cross-correlation among sequences, e.g., represented by the inner product between two sequences, or the cross-correlation within a timing detection window, should be kept close to zero. It is noted that the cross-correlation depends on how many side-peaks of the cross-correlation function which appear within the timing detection window and the magnitude of these side-peaks depends on the modulation sequence.

One example of constructing a near-orthogonal set is to define an orthogonal matrix, where each column (or row) comprises one sequence and all sequences (i.e., columns or rows) in the matrix are orthogonal. The matrix may, e.g., contain DFT sequences or cyclically shifted ZC sequences. From this matrix, the near-orthogonal set is obtained by removing one or more columns and/or removing one or more rows. This means that some sequences may be completely removed from the orthogonal set and/or that some sequences have elements expurgated such that they become non-orthogonal. The removal of rows and columns could be systematic for the maximum pairwise cross-correlation of random access preambles within the detection time window to be less than a pre-defined level (e.g., 15%) that ensures the resultant probability of false detection no higher than the predefined target value (e.g., 0.1%).

In an embodiment of the invention, the set of non-orthogonal sequences is constructed from a set of orthogonal sequences by expurgating at least one element of said orthogonal sequences such that the sequence length becomes A and removing a subset of said expurgated sequences.

Furthermore, the general sequence construction Eq. (7) and (8) can be extended to use multiple long sequences $a(u)$. The benefit of this is that a larger set of preamble sequences could be generated, since the total number of sequences is the product of the number of short sequences and the number of long sequences.

Thus, we will introduce an additional index $r=0,1 \ldots ,R-1$ to label R different orthogonal sets:

$$Z_{m,r,n}(\overline{\Omega_m}) = c_{r,n}(Al+l) \quad (11)$$

$$c_{r,n}(u) = b_n(u \bmod A) a_r(u). \quad (12)$$

It is straightforward to show that with the permuted long sequence, the ZAZ still remains. On the other hand, the ZCZ will not be maintained but the maximum cross-correlation can be bounded as will be shown. Let us assume now that the sequences $\{a_g(u)\}$ and $\{a_h(u)\}$ are defined by Eq. (12), for two different permutations $\mu=\alpha$ and $\mu=\beta$, respectively. A permutation implies that the elements of the sequence are re-ordered. Then it follows that:

$$\theta_{z_{m,g},x_{m,h,y}}(p \geq 0) = \frac{1}{N} \sum_{l=0}^{A-1} b_x(l) b_y^*(l) W_N^{pjm,l} \cdot \sum_{i=0}^{t-1} W_t^{[\alpha(l)-\beta(l)+p]i}. \quad (13)$$

Let us assume now that $$\alpha(l) - \beta(l) = \gamma(l) \bmod A \quad (14)$$

where $\gamma(l)$ is the l-th element of a permutation $\gamma$ of the sequence $\{0,1,\ldots,A-1\}$. If A is a prime number, a set of A−1 permutations satisfying the condition in Eq. (14) can be constructed as $$\mu_r(l) = rl \bmod A, \, r=1,2,\ldots,A-1, \, l=0,1,\ldots,A-1. \quad (15)$$

If $A=P-1$, where P is a prime number, a set of A permutations satisfying the condition in Eq. (14) can be constructed as $$\mu_r(l) = r\alpha^l \bmod P, \, r=1,2,\ldots,A, \, l=0,1,\ldots,A-1. \quad (16)$$

where $\alpha$ is a primitive element of GF(P), and where GF denotes a Galois field. With the above permutations, it can be shown that the cross-correlation among random access preambles is bounded by:

$$|\theta_{z_{m,g},x_{m,h,y}}(p)| = \frac{1}{\delta}, \text{ for } t = A$$

$$|\theta_{z_{m,g},x_{m,h,y}}(p)| \leq \frac{1}{\delta}, \text{ for } t > A$$

$$|\theta_{z_{m,g},x_{m,h,y}}(p)| = \frac{1}{\delta}\left\lceil\frac{A}{t}\right\rceil, \text{ for } t < A$$

where $\lceil \cdot \rceil$ is the ceiling operator.

One embodiment of the invention comprises performing permutations of the long sequence according to $\mu_r(l) = rl \bmod A$, $r=1,2,\ldots,A-1$, $l=0,1,\ldots,A-1$ if A is a prime number, or according to $\mu_r(l) = r\alpha^l \bmod P$, $r=1,2,\ldots,A$, $l=0,1,\ldots,A-1$ if $A=P-1$, where P is a prime number.

An interesting special case of the sequences in Eq. (7) and (8) is obtained if $$a(u) = W_{At}^{au(u+At \bmod 2+2q)/2} \quad (17)$$

$$b_n(u \bmod A) = a(tn) W_A^{an(u \bmod A)} \quad (18)$$

where a and q are integers, and a is relatively prime to At. By inserting Eq. (17) and (18) into Eq. (7) we obtain $$c_n(u) = a(u) a(tn) W_{At}^{autn}. \quad (19)$$

The sequence in Eq. (19) is a Zadoff-Chu (ZC) sequence, which has the property that its cyclically-shifted version $a(l+p)$ can be decomposed as $$a(u+p) = a(u) a(p) W_{Ut}^{aup}. \quad (20)$$

By applying Eq. (19) to (20) we obtain $$c_n(u) = a(u+tn). \quad (21)$$

Thus, in an embodiment of the invention, the general modulation sequence is a ZC sequence which is cyclically shifted by the increments of t. This means that the client device 100 according to this embodiment is configured to determine a modulation sequence for the random access preamble such that the modulation sequence is a ZC sequence cyclically shifted by the increments of the subband size t.

ZC sequences include the root index parameter u. In an embodiment of the invention, the short sequence is generated by a length-A ZC sequence with root index {1, 2, . . . , A−1}. Furthermore, multiple sequences can be generated by cyclic shifts of the sequence. One example is using a cyclic shift of $N_{CS}$, i.e., the sequence is cyclically shifted $N_{CS}$ steps.

In an embodiment of the invention, the short sequence is generated by a column of the A×A DFT matrix. For example, multiple sequences can be generated with column indexes {0, $$N_{CS}, 2N_{CS}, \ldots, \left(\left\lfloor \frac{A}{N_{CS}} \right\rfloor - 1\right) N_{CS}\}, \text{ i.e.,}$$

there are $(A-1)\left\lfloor \frac{A}{N_{CS}} \right\rfloor$ first sequences.

In an embodiment of the invention, the long sequence is generated according to the formula $$a(u) = W_t^{(u \bmod A)\left\lfloor \frac{u}{A} \right\rfloor}, u = 0, 1, \ldots, At-1$$

where $$W_t = e^{-\sqrt{-1}\frac{2\pi}{t}},$$

A is the number of time-frequency resources allocated for the random access preamble in a subband, t is the number of subbands, mod is the modulo operator, and $\lfloor \cdot \rfloor$ is the floor function. When t=A, it can be shown analytically that this sequence generates a random access preamble with 0 dB PAPR.

In an embodiment of the invention, the q-th long sequence is generated according to the formula $$a_q(u) = W_t^{\pi_q(u \bmod A)\left\lfloor \frac{u}{A} \right\rfloor}, u = 0, 1, \ldots, At-1$$

where $\pi_q(\cdot)$ is a permutation over the set {0,1,2, . . . ,A−1}, i.e., where π(l) is the l-th element of a permutation π of the sequence {0,1, . . . ,A−1}, $$W_t = e^{-\sqrt{-1}\frac{2\pi}{t}},$$

A is the number of time-frequency resources allocated for the random access preamble in a subband, t is the number of subbands, mod is the modulo operator, and $\lfloor \cdot \rfloor$ is the floor function. When t=A, it can be shown analytically that this second sequence generates a random access preamble with 0 dB PAPR. The permutation allows generating multiple sequences by different permutations as to increase the total number of random access preambles.

The disclosed random access preamble could also be used for other purposes than described herein. For example, if the random access preamble modulation sequence is known to the network access node 300, it can serve as a reference signal used to estimate the channel or interference. Hence, the random access preamble disclosed herein could potentially also be used as a Demodulation Reference Signal (DMRS) or a Sounding Reference Signal (SRS) in a system using B-IFDMA.

The client device 100 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network access node 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the network access node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A client device for a wireless communication system, comprising:
   at least one processor; and
   one or more memories coupled to the at least one processor and storing programming instructions for execution by the at least one processor to cause the client device to:
      determine at least one time-frequency resource allocated for a random access preamble;
      determine a modulation sequence for the random access preamble, wherein the modulation sequence is based on a first sequence and a second sequence, the first sequence being a sequence from a set of near-orthogonal sequences and the second sequence being a sequence from a set of constant envelope sequences, wherein at least one of the first sequence or the second sequence is a Discrete Fourier Transform (DFT) sequence, a permutation of a DFT sequence, or a cyclic shift of a DFT sequence; and
      transmit a signal comprising a random access preamble to a network access node, wherein the random access preamble comprises the modulation sequence mapped onto the determined at least one time-frequency resources.

2. The client device according to claim 1, wherein time-frequency resources of the wireless communication system are divided into disjoint frequency subbands, and wherein the at least one time-frequency resources allocated for the random access preamble is the same in each of the disjoint frequency subbands.

3. The client device according to claim 1, wherein the time-frequency resources allocated for the random access preamble are non-contiguous in frequency.

4. The client device according to claim 2, wherein the time-frequency resources allocated for the random access preamble comprise a plurality of subcarriers, and wherein a length of the first sequence is equal to a number of subcarriers in each of the disjoint frequency subbands allocated for the random access preamble.

5. The client device according to claim 2, wherein the time-frequency resources allocated for a random access preamble comprise a plurality of subcarriers, and wherein a length of the second sequence is equal to a total number of subcarriers from all of the disjoint frequency subbands allocated for the random access preamble.

6. The client device according to claim 1, wherein the first sequence is repeated, and wherein a length of the repeated first sequence is equal to a length of the second sequence.

7. The client device according to claim 1, wherein the set of near-orthogonal sequences only comprises orthogonal sequences.

8. The client device according to claim 1, wherein the set of near-orthogonal sequences is constructed from a set of orthogonal sequences by expurgating at least one element of the set of orthogonal sequences and removing a subset of said expurgated sequences.

9. The client device according to claim 1, wherein at least one of the first sequence and the second sequence is any of a Zadoff-Chu (ZC) sequence; a permutation of a ZC sequence; or a cyclic shift of a ZC sequence.

10. The client device according to claim 1, wherein the second sequence a is generated according to the formula:

$$a(u) = W_t^{(u \bmod A)\lfloor \frac{u}{A} \rfloor},$$

$$u = 0, 1, \ldots, At - 1,$$

where $$W_t = e^{-\sqrt{-1}\frac{2\pi}{t}},$$

A is a number of time-frequency resources allocated for the random access preamble in a subband, t is a number of subbands, mod is a modulo operator, and $\lfloor \cdot \rfloor$ a floor function.

11. The client device according to claim 1, wherein the second sequence a is generated according to the formula:

$$a_q(u) = W_t^{\pi_q(u \bmod A)\lfloor \frac{u}{A} \rfloor},$$

$$u = 0, 1, \ldots, At - 1,$$

where $\pi_q(\cdot)$ is a permutation over the set $\{0, 1, \ldots, A-1\}$, $$W_t = e^{-\sqrt{-1}\frac{2\pi}{t}},$$

A is a number of time-frequency resources allocated for the random access preamble in a subband, t is a number of subbands, mod is a modulo operator, and $\lfloor \cdot \rfloor$ is a floor function.

12. A network access node for a wireless communication system, comprising:
   at least one processor; and
   one or more memories coupled to the at least one processor and storing programming instructions for execution by the at least one processor to cause the network access node to:
      receive a signal comprising a random access preamble from a client device, wherein the random access preamble comprises a modulation sequence mapped onto at least one time-frequency resource allocated for a random access preamble, wherein the modulation sequence is based on a first sequence and a second sequence, the first sequence being a sequence from a set of near-orthogonal sequences and the second sequence being a sequence from a set of constant envelope sequences, wherein at least one of the first sequence or the second sequence is a Discrete Fourier Transform (DFT) sequence, a permutation of a DFT sequence, or a cyclic shift of a DFT sequence;

determine the time-frequency resources allocated for a random access preamble; and detect at least one of the random access preamble and an arrival time of the random access preamble based on the determined time-frequency resources allocated for a random access preamble and the signal.

13. A method, the method comprising:

determining at least one time-frequency resource allocated for a random access preamble;

determining a modulation sequence for the random access preamble, wherein the modulation sequence is a product of a first sequence and a second sequence, the first sequence being a sequence from a set of near-orthogonal sequences and the second sequence being a sequence from a set of constant envelope sequences, wherein at least one of the first sequence or the second sequence is a Discrete Fourier Transform (DFT) sequence, a permutation of a DFT sequence, or a cyclic shift of a DFT sequence; and transmitting a signal comprising a random access preamble to a network access node, wherein the random access preamble comprises the modulation sequence mapped onto the determined at least one time-frequency resources.

14. The method according to claim 13, wherein time-frequency resources of a wireless communication system are divided into disjoint frequency subbands, and wherein the at least one time-frequency resource allocated for the random access preamble is the same in each of the disjoint frequency subbands.

15. The method according to claim 13, wherein the time-frequency resources allocated for the random access preamble are non-contiguous in frequency.

16. The method according to claim 15, wherein the time-frequency resources allocated for the random access preamble comprise a plurality of subcarriers, and wherein a length of the first sequence is equal to a number of subcarriers in each of the disjoint frequency subbands allocated for the random access preamble.

17. The method according to claim 14, wherein the time-frequency resources allocated for a random access preamble comprise a plurality of subcarriers, and wherein a length of the second sequence is equal to a total number of subcarriers from all of the disjoint frequency subbands allocated for the random access preamble.

18. The method according to claim 13, wherein the first sequence is repeated, and wherein a length of the repeated first sequence is equal to a length of the second sequence.

19. The method according to claim 13, wherein the set of near-orthogonal sequences only comprises orthogonal sequences.

20. The method according to claim 13, wherein the set of near-orthogonal sequences is constructed from a set of orthogonal sequences by expurgating at least one element of the set of orthogonal sequences and removing a subset of the expurgated sequences.

* * * * *

UNITED STATES PATENT AND TRADEMARK OFFICE
CERTIFICATE OF CORRECTION

PATENT NO. : 11,956,107 B2
APPLICATION NO. : 17/370444
DATED : April 9, 2024
INVENTOR(S) : Branislav M. Popovic, Peng Wang and Fredrik Berggren It is certified that error appears in the above-identified patent and that said Letters Patent is hereby corrected as shown below:

In the Claims

Column 18, Line 36, Claim 10, before "a" please insert -- is --;

Column 20, Line 10, Claim 16, please delete "15," and insert -- 14, --.

Signed and Sealed this
Twentieth Day of August, 2024

Katherine Kelly Vidal
*Director of the United States Patent and Trademark Office*